Sept. 10, 1935.  H. E. FOX  2,014,082
SPOT WELDING PROCESS AND APPARATUS
Filed April 3, 1933   2 Sheets-Sheet 1
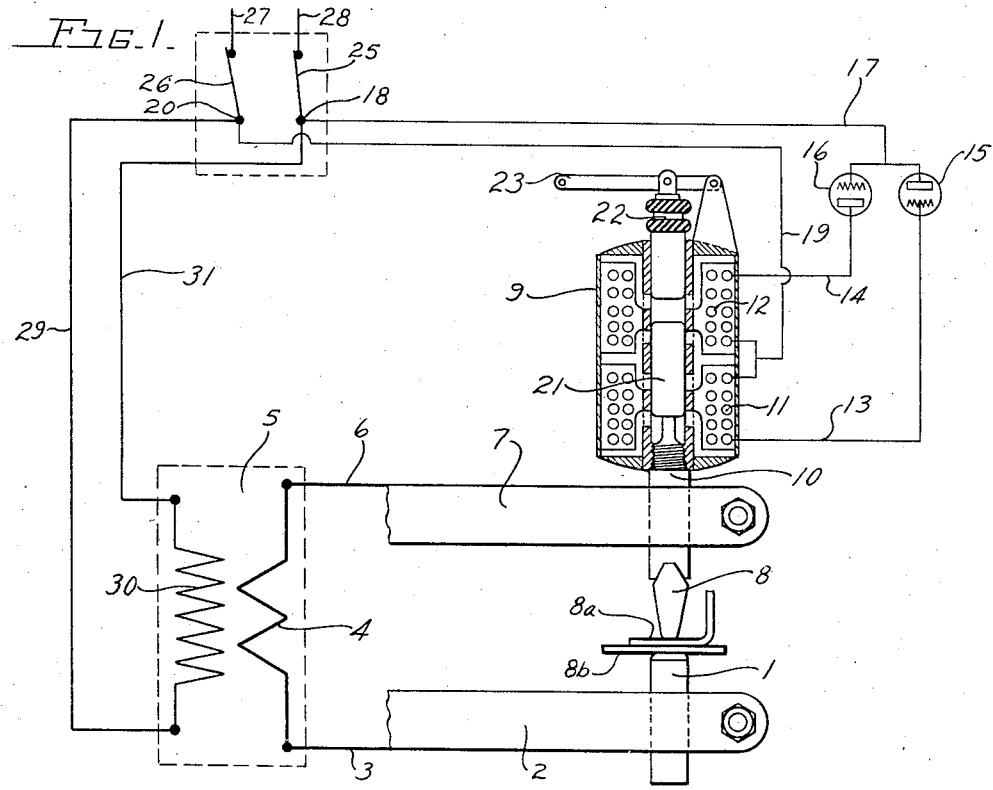
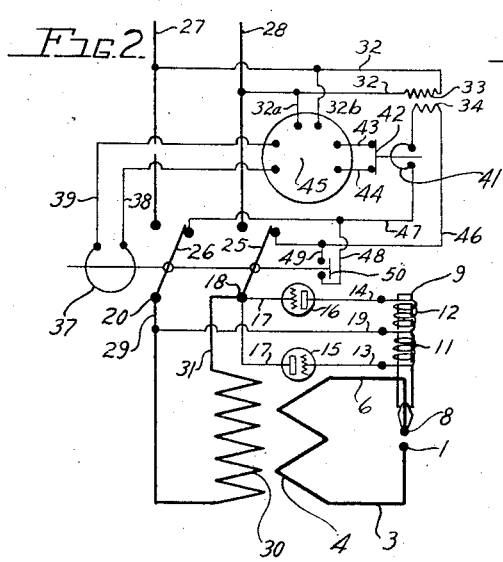
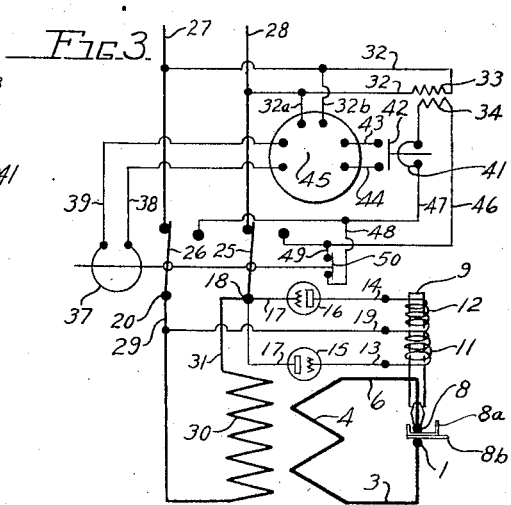
INVENTOR.
Harold E. Fox.
BY
Toulmin & Toulmin
ATTORNEYS.

Sept. 10, 1935.  H. E. FOX  2,014,082
SPOT WELDING PROCESS AND APPARATUS
Filed April 3, 1933  2 Sheets-Sheet 2
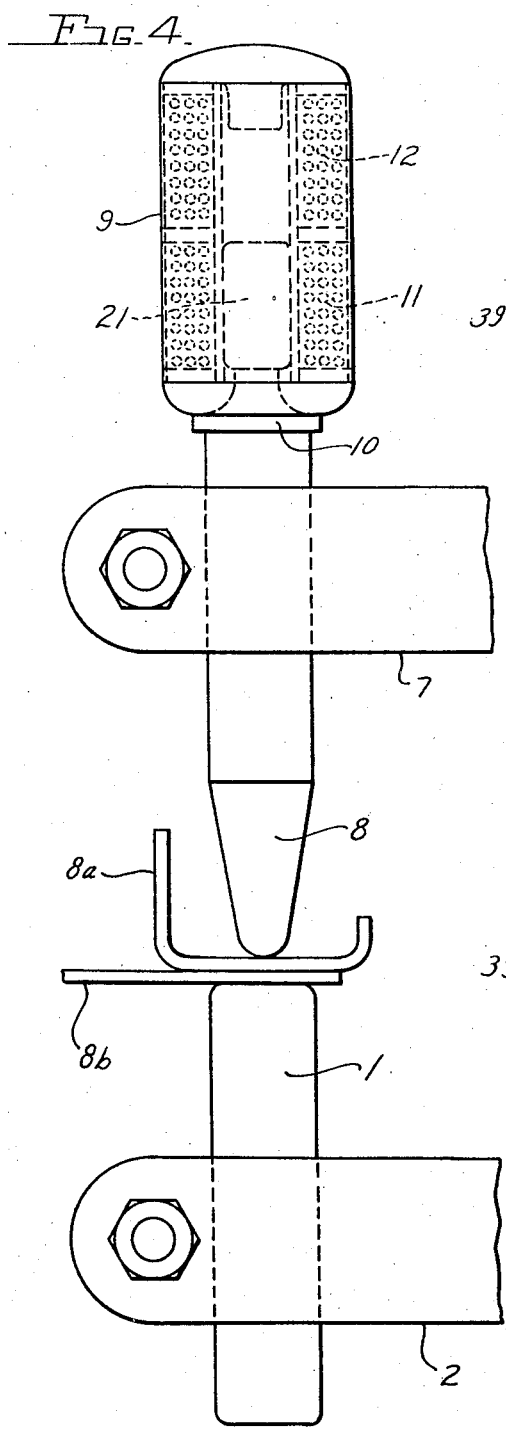
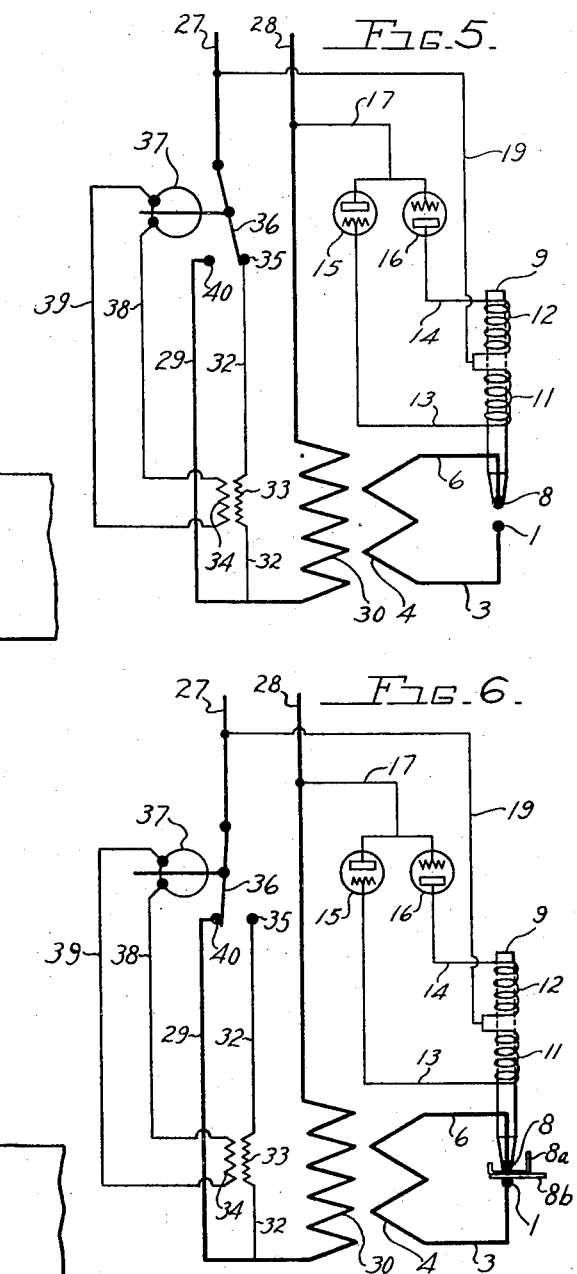
INVENTOR.
Harold E. Fox.
BY
ATTORNEYS.

Patented Sept. 10, 1935

2,014,082

UNITED STATES PATENT OFFICE 2,014,082

SPOT WELDING PROCESS AND APPARATUS

Harold E. Fox, Stoneleigh, Md., assignor, by mesne assignments, to North American Aviation, Inc., a corporation of Delaware Application April 3, 1933, Serial No. 664,125

5 Claims. (Cl. 219—10)

It is the object of my invention to provide vibratory pressure spot welding in combination with electric spot welding.

It is my object to provide a mechanism for automatically applying a large number of light blows per minute to a movable welding electrode in addition to the manual pressure applied and to synchronize the degree of such blows and of such pressure.

It is my object to provide a vibrating pressure to the weld at the same time the pieces are being welded together, such vibrating pressure being applied independently of the manual pressure thereby greatly improving the physical properties of the welds.

Heretofore in the art, attempts at vibratory pressure spot welding have been made particularly by hammering the spot welds and welded seams after the welding operation. This is particularly true of the welding of aluminum and its alloys.

It is my object to provide for the mechanical work comprising a vibrating pressure during the welding operation.

It is a further object to apply this vibrating pressure electrically and to control the amount and time duration thereof according to the actual welding current flowing through the electrode circuit.

It is my object to provide means of working the weld while it is being subjected to manual pressure and to electric current in order to provide a homogeneous strong weld.

It will be understood that the hammer may be operated mechanically, electrically or pneumatically. For the purpose of illustration I have shown an electrical arrangement.

Referring to the drawings:

Figure 1 is a diagrammatic view of the hammer and electrical circuit into which it is collected;

Figure 2 illustrates another form of circuit into which my invention may be connected which will control electrically the application of the vibratory pressure spot welding at the same time that the welding current is applied;

Figure 3 is a similar view showing the circuit in closed position with the current flowing and the hammering taking place;

Figure 4 is a view of an alternate form of hammer and circuit;

Figure 5 is a diagrammatic view of a simplified form of circuit with the hammer applied showing the parts in open position;

Figure 6 is a similar view showing the parts in closed position.

Referring to the drawings in detail, I indicates a stationary electrode mounted in the arm 2 which is connected to the wire 3. This wire is connected to one side of the secondary 4 of a welding transformer generally designated 5. The other side of this secondary 4 is connected by the wire 6 to the movable arm 7 which is manually operated to actuate the electrode 8 so that it will press against the plates 8a and 8b that are being welded.

This mechanism for manual movement of the arm 7 forms no part of the present invention.

The electrode 8 is connected to the hammer 9. It will be understood that the electrode to which this hammer is attached need not be made pivotal or slidable. The electrode is brought down into contact with the work developing a pressure in the work pieces that is dependent on the surface contact resistance existent.

The high speed impact blows against the steel anvil 10 on top of the electrode will produce pressures between the electrode tips very much higher than the static pressure developed manually even though a considerable mass is interposed in the electrode proper and the electrode arm.

Sufficiently high stresses are developed in the work to secure a satisfactory refinement of the structure.

Referring to the hammer in detail, which is generally designated 9, it consists of two coils 11 and 12 connected by the wires 13 and 14 respectively to the tubes 15 and 16 which are, in turn, connected by the wires 17 to the terminal 18 of a switch. The other ends of the coils are connected by a common wire 19 to the other terminal of the switch as at 20. These two windings of the hammer actuate the hammer member 21 in such a fashion that the alternating current supply is rectified, one-half wave passing through each coil, resulting in the reciprocation of the hammer plunger 21 in synchronism with the supply current, producing one blow for each cycle. With a sixty-cycle current, there will be sixty blows per second.

By moving the rear or top bumper 22 of the hammer downwardly by the lever 23, the stroke and resulting force of the blow is controllable at will. This bumper may be connected to the lever which controls the static pressure on the work in such a fashion that the initial blows will be light during the interval in which the work is in fused or soft state and will be increased in force as the work cools off. This type of hammer is instantaneous in action and can be connected so that it will start concurrently with the welding current.

Consequently, there is connected to the terminal 18 a switch plate 25 and to the terminal 20 a switch plate 26 by which the power supply lines 27 and 28 are put in circuit. The terminal 20 is connected by the wire 29 to one side of the primary 30 of the welding transformer, the other side of the transformer being connected by the wire 31 to the terminal 18.

Upon the closing of the switch plates 25 and 26 the welding operation is initiated as well as the hammer operation.

In order to still further control the operation of this hammer I have provided a circuit in which the welding current is not applied for welding purposes until there has been accomplished a predetermined reduction in resistance in the work pieces 8a and 8b between the electrode tips 1 and 8. When this resistance is decreased to a predetermined value, then the main welding or second stage of current for welding purposes is applied to the electrodes. For this purpose, there is provided, as will be seen in the simplified form in Figures 5 and 6, a line 32 having a primary winding 33 in association with a secondary winding 34. This wire 32 terminates in a terminal 35 engaged by a switch blade 36 which, in turn, is connected to the line 27. This switch is opened by the relay 37 which is connected in circuit by the wires 38 and 39 to the secondary 34. Therefore, when the resistance is decreased to the point necessary for applying the welding current, the switch 36 opens and moves over to the terminal 40 in the line 27 and the full welding current is applied.

This same principle is applied in the diagram shown in Figures 2 and 3 where there is added the feature of an automatic cutout or timer. In this arrangement, the starting relay 41 has the switch 42 which bridges the wires 43 and 44 that are connected into the timer 45. The wires 32 are connected by the wires 32a and 32b into the timer 45. Into this timer are connected the wires 38 and 39, which control the relay 37 for operating the switch blades 25 and 26.

When these blades are so operated, the circuit containing the secondary 34 comprising the wires 46 and 47 is adapted to be shunted by the wires 48 and 49 and the switch 50 connected to the switch members 25 and 26 and operated by the relay 37.

It will be understood that by moving the rear or top bumper of the hammer down the stroke and resulting force of the blow is controllable at will. This bumper may be interconnected to the lever which controls the static pressure on the work in such a fashion that the initial blows will be light during the interval at which the work is in a fused or soft state, and be increased in force as the work cools off. Since this type hammer is instantaneous in action, it can be connected so that it will start concurrently with the start of the welding current. With the connections as shown the hammer would only operate during the interval while the welding current was flowing. It may prove desirable to continue this operation for some definite period after welding current has been interrupted and while the work pieces are cooling. This could be easily accomplished by mechanically or electrically interlocking with the lever operating the electrode arms and could also be started in the same fashion, controlling the stroke so that very light blows would be struck up to the point where the work pieces have started to cool.

It will be understood that I desire to comprehend within my invention such modifications as may be necessary to adapt it to varying conditions and uses.

It is further understood that the welding operation is defined as covering that period of time the electrodes are in contact with the work pieces.

Having thus fully described my invention, what I claim as new and desire to secure by Letters Patent, is:

1. That process of welding a plurality of work pieces by pressing the sheets together and passing through the locality from one piece to the other an electrical current of sufficient amperage and for a sufficient time to weld the contacting portions, and applying a vibrating pressure by a series of blows on the electrodes to work the weld during the welding operation, and controlling the vibrating pressure so that the initial blows will be light during the interval in which the work is in fused or soft state, and increasing the force of the blows as the work cools off.

2. That process of welding a plurality of work pieces by pressing the sheets together and passing through the locality from one piece to the other an electrical current of sufficient amperage and for a sufficient time to weld the contacting portions together, and applying simultaneously a vibrating pressure by a series of blows on the electrodes to work the weld during the welding operation, starting the vibrating pressure concurrently with the start of the welding current, and controlling the vibrating pressure so that the initial blows will be light during the intervals in which the work is in fused or soft state, and increasing the force of the blows as the work cools off.

3. That process of welding a plurality of work pieces by pressing the sheets together and passing through the locality from one piece to the other an electrical current of sufficient amperage and for a sufficient time to weld the contacting portions together, and applying a vibrating pressure on the electrodes to work the weld during the welding operation, and controlling the vibrating pressure so that the initial blows will be light during the interval in which the work is in fused or soft state, and increasing the force of the blows as the work cools off, discontinuing the welding current, and continuing with increased intensity the vibrating pressure while the work pieces are cooling.

4. In a welding apparatus for welding metal plates by the simultaneous fusing of the metal thereof and the delivery of a rapid succession of blows thereon, a pair of electrodes adapted to be forced directly against opposite sides of overlapped plates, a source of electric current, means electrically connecting said source to said electrodes, means for applying impacts to at least one of said electrodes, and means for varying the amplitude of the impacts applied to said electrodes, whereby the means for applying impacts may be controlled so that the initial blows will be light during the interval in which the work is in fused or soft state, and may be increased in force as the work cools off.

5. In a welding apparatus for welding metal plates by the simultaneous fusing of the metal thereof and the delivery of a rapid succession of blows thereon, a pair of electrodes adapted to be forced directly against opposite sides of overlapped plates, a source of electric current, means electrically connecting said source to said electrodes, electrical means for applying impacts to at least one of said electrodes, and means for varying the amplitude of the impacts applied to said electrodes, whereby the means for applying impacts may be controlled so that the initial blows will be light during the interval in which the work is in fused or soft state, and may be increased in force as the work cools off.

HAROLD E. FOX.